US012337263B2

(12) United States Patent
Schmidt et al.

(10) Patent No.: US 12,337,263 B2
(45) Date of Patent: Jun. 24, 2025

(54) LIQUID DEGASSING MEANS AND METHOD

(71) Applicant: Enapter S.r.l., Crespina Lorenzana (IT)

(72) Inventors: Jan-Justus Schmidt, Crespina Lorenzana (IT); Max István Schmidt, Crespina Lorenzana (IT)

(73) Assignee: Enapter S.r.l., Crespina Lorenzana (IT)

( * ) Notice: Subject to any disclaimer, the term of this patent is extended or adjusted under 35 U.S.C. 154(b) by 483 days.

(21) Appl. No.: 17/620,653

(22) PCT Filed: Jun. 12, 2020

(86) PCT No.: PCT/EP2020/066399
§ 371 (c)(1),
(2) Date: Dec. 17, 2021

(87) PCT Pub. No.: WO2020/254211
PCT Pub. Date: Dec. 24, 2020

(65) Prior Publication Data
US 2022/0314143 A1    Oct. 6, 2022

(30) Foreign Application Priority Data
Jun. 18, 2019  (GB) ..................... 1908727

(51) Int. Cl.
*B01D 19/00*   (2006.01)
*C25B 1/00*    (2021.01)
*C25B 15/08*   (2006.01)

(52) U.S. Cl.
CPC ..... *B01D 19/0042* (2013.01); *B01D 19/0021* (2013.01); *B01D 19/0063* (2013.01); *C25B 15/083* (2021.01)

(58) Field of Classification Search
CPC ........... B01D 19/0042; B01D 19/0021; B01D 19/0063; B01D 19/0047; Y02E 60/36;
(Continued)

(56) References Cited

U.S. PATENT DOCUMENTS 2,610,697 A * 9/1952 Lovelady ............... B01D 45/02
210/801
2,783,854 A * 3/1957 Lovelady ........... B01D 19/0042
210/182
(Continued)

FOREIGN PATENT DOCUMENTS

EP      2772290 A1    9/2014
GB      1045102 A    10/1966
(Continued)

OTHER PUBLICATIONS

Machine-generated English translation of JP 2005-087779 A, published Apr. 2005.*

*Primary Examiner* — Frank M Lawrence, Jr.
(74) *Attorney, Agent, or Firm* — Hodgson Russ LLP

(57) ABSTRACT

A liquid degasser comprises a tank, the tank having one or more baffle(s) within the body of the tank, with at least one baffle defining a first and second region. The first region houses relatively turbulent conditions compared to the second region. There is a both a gas transfer gap and a liquid transfer gap, allowing the transmission of fluid from the first to second regions. An inlet introduced the mixture to be degassed to an antechamber, with the fluid travelling onwards to the first region, and then through the gas and liquid transfer gaps to the second region. A first outlet allows for the degassed liquid to leave the tank, and a second outlet allows for the purged gas mixture to also leave the tank. Sensors and complementary control units allow for better operation of the unit.

13 Claims, 4 Drawing Sheets

Figure 1A:
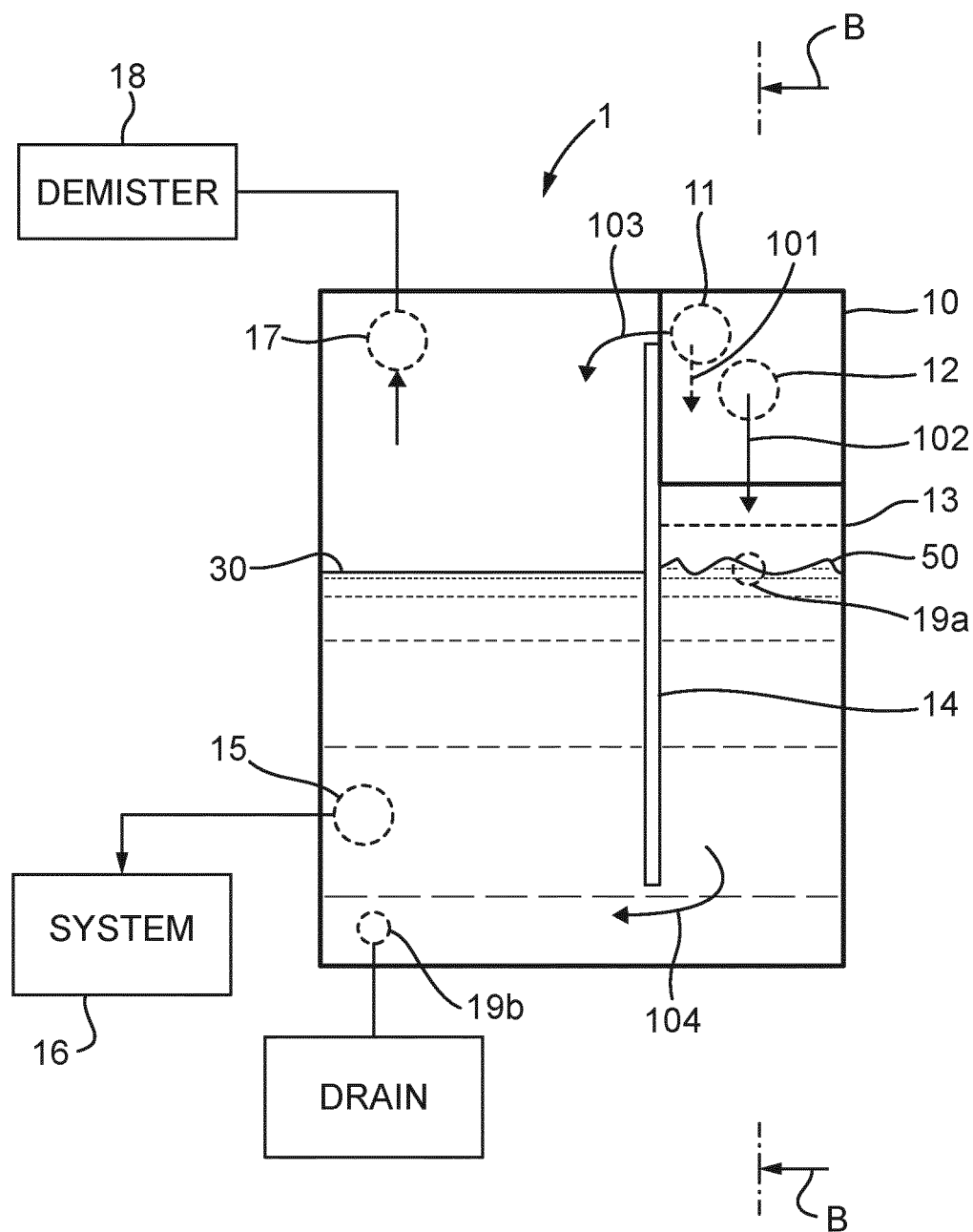

(58) Field of Classification Search
CPC ......... C25B 15/083; C25B 15/08; C25B 1/04; C25B 9/00
USPC ............ 95/14, 18, 19, 24, 260, 262; 96/157, 96/204, 206, 220
See application file for complete search history.

(56) References Cited

U.S. PATENT DOCUMENTS

| | | | |
|---|---|---|---|
| 3,639,223 A * | 2/1972 | Blanchfield | C25B 15/08 |
| | | | 204/278 |
| 3,676,984 A | 7/1972 | Clark | |
| 3,920,424 A | 11/1975 | Estep et al. | |
| 4,539,023 A * | 9/1985 | Boley | E21B 43/36 |
| | | | 96/184 |
| 5,132,011 A | 7/1992 | Ferris | |
| 6,251,167 B1 | 6/2001 | Berson | |
| 8,470,080 B1 | 6/2013 | Ball, IV et al. | |
| 2009/0282985 A1* | 11/2009 | Whiteley | B01D 17/0211 |
| | | | 96/204 |

FOREIGN PATENT DOCUMENTS

| | | | |
|---|---|---|---|
| GB | 2012608 A | | 8/1979 |
| JP | 2005087779 A | * | 4/2005 |
| WO | 2012088728 A1 | | 7/2012 |

* cited by examiner

LIQUID DEGASSING MEANS AND METHOD

The present invention relates to means and a method for liquid degassing, particularly, but not limited for use in degassing liquid to be used in an electrolytic cell, or stack thereof.

Electrolysers are devices used for the generation of hydrogen and oxygen by splitting water. Such systems generally fall in one of three main technologies currently available, namely anion exchange membrane (AEM), proton exchange membrane (PEM), and liquid alkaline systems.

AEM electrolytic stacks offer some advantages over liquid alkaline since the liquid solution can be fed to one side of the cell (e.g. anode half cell) only. However, in the anode half cell oxygen is produced and may be dissolved and circulated together with water (or an aqueous solution) in the liquid piping to the tank. In order to maintain efficiency, and keep the electrolyser volume as limited as possible the waste gases dissolved in the water or aqueous solution should be removed.

There are multiple known methods for degassing aqueous solutions. These include utilising Henry's Law and reducing the pressure of the system. As the amount of dissolved gas is proportional to its partial pressure, reducing the pressure of the system reduces the solubility of dissolved gases. This is also known as vacuum degasification. This can be costly to implement, as well as requiring more space than may be available.

Alternatively, thermal regulation may be employed. At higher temperatures gases are generally less soluble, therefore heating of an aqueous solution can result in the purging of dissolved gases of the solvent. This is not applicable in all scenarios as a certain operating temperature may be required for optimal operation.

Membrane degasification is yet another alternative, wherein a membrane is used which allows the transfer of gases, but not liquids. Whilst this can result in the removal of all dissolved gases, it is another component which may require replacing, and may not be compatible with the electrolytic solution.

Yet another option is sparging the aqueous solution with an inert gas, this can result in reduced efficiencies of the system in certain uses, and therefore is not always suitable. Adding a reductant is also not suitable for certain applications, as the resultant ions may reduce efficiency of the solution. There may also be precipitate resultant from the addition of a reducing agent which may result with caking of the membrane, and further reductions in efficiency.

The object of the present invention is to provide improved means for liquid degassing, particularly for, but not limited to, use in electrolyser systems.

According to the invention there is provided means for degassing a liquid-gas mixture within a system, said means comprising:
  an enclosed tank to contain a liquid, the liquid having a normal operating level at an intermediate height within the tank, the tank having:
    one or more baffle(s) within the body of the tank, wherein:
      at least one of the baffle(s) substantially defines a boundary of a first region and a second region, wherein:
        the first region accommodates relatively turbulent conditions for the liquid, and
        the second region accommodates relatively calm conditions for the liquid,
    wherein there is provided:
      a liquid transfer gap for the transfer of liquid from the first region to the second region, and
      a gas transfer gap for the transfer of gas from the first region to the second region,
    an inlet, the inlet being for the introduction of a liquid-gas mixture, and
    an antechamber, wherein:
      the inlet enters the antechamber, and
      the antechamber has an outlet directed towards the first region, the antechamber outlet being above the normal operating level of the liquid, and
    a first outlet, wherein:
      the first outlet is adapted for the outflow of the substantially degassed liquid, and
      the first outlet is situated in the lower half of the tank, substantially below the normal operating level of the liquid and
    a second outlet, wherein:
      the second outlet is adapted for the outflow of the gas purged from the liquid-gas mixture, and
      the second outlet is situated in the upper half of the tank, substantially above the normal operating level of the liquid and
    means to cause flow of the liquid-gas mixture to the tank, and means to cause flow of substantially degassed liquid from the tank.

As used herein, the term "liquid-gas mixture" is used broadly to encompass any and all fluid flowing through the tank, including but not limited to aqueous solutions, liquid with dissolved gas, liquid and gas, liquid and vapours, liquids gases and vapours etc.

As used herein, the term "gas" is used broadly to encompass any gas, vapour or mixture thereof, the term "gas-vapour mixture" may also be used.

As used herein, the term "system" is used broadly to encompass any system the tank forms a part of, particularly, but not limited to, electrolysers.

As used herein, the term "turbulent conditions" is used to refer to the turbulence observed in the first region of the tank. The term "calm conditions" is used to refer to the relatively calm nature of the substantially degassed liquid obtained in the second region. The first region may also be regarded as a "settling" region, and the second region as the "settled" region.

In the preferred embodiment, the first outlet is preferably in the second region of the tank. Alternatively, it may be in the first region.

The antechamber may be adapted to accommodate, and optionally create, turbulent flow of the liquid as it is introduced, or to increase turbulence of the liquid once introduced. By way of example the antechamber may be substantially cylindrical, with the antechamber inlet and the antechamber outlet not being aligned. Alternatively, an elliptical antechamber may be used, or of another suitable geometric cross section.

Whilst it is envisaged that the tank will work with no further outlets, it is envisaged that a third outlet may be provided to act as a drain. Such a drain will preferably be located at or near the bottom of the tank such that the system will substantially empty, if not completely, if and when the drain is opened. The drain can be from the first region, but preferably drains the system from the second region.

In addition to a drain, it is envisaged that a secondary inlet may be provided, the second inlet being a refill inlet to refill the system, if and when required. Whilst it is envisaged that the refill inlet could be in the second region, or the antechamber, in the preferred embodiment the refill inlet is to the first region.

Both a drain and refill system could be operated manually, but it is envisaged that a control unit would be employed with pre-determined thresholds to automatically ensure levels are kept in a desired range. The same can be said for temperature control as well as the control of other parameters. Normally, an upper and lower threshold will be used for most sensors and their relevant parameters. It is envisaged that such upper and lower thresholds are pre-determined.

Whilst it is possible for the system to work without the aid of sensors, it is preferred to employ one or more sensors. Preferably, the one or more sensors can be connected to one or more control units. The control unit is preferably adapted to maintain the conditions of the tank within a desired range.

Normally, there is at least one water level sensor to measure and monitor the water level. Preferably, there are two, or the sensor is adapted to be able to measure both upper and lower regions-thresholds within the tank. It is envisaged that the water sensor or sensors will be connected to one or more control unit, triggering the filling or draining of the tank in order to maintain a desired level within the tank, or a desired volume in the system. If not a specific level, the controls are preferably adapted to maintain the measured parameters in a suitable, normally pre-determined, range.

Some systems may require a certain temperature to be maintained in order to operate properly. As such, a heating element or heat exchanger may be provided. Preferably, a temperature sensor is also provided, said temperature sensor being connected to one or more control units, thereby controlling the heating/cooling unit. For energy efficiency reasons, heat integration may be practiced; such a feature would be dependent upon the system of use.

Whilst there would normally be pressure sensors elsewhere in a system which may employ this tank, it is envisaged that the tank may also be provided with a pressure sensor in order to ensure the pressure does not exceed operating capacity, such as if the second outlet, or any outlet, were to become blocked. Accordingly, there may be a pressure relief valve, mechanical or otherwise, or any other suitable component to maintain desired operating conditions.

It is envisaged that the first outlet, for liquid, is in the lower half of the tank. Preferably, it is located substantially at or near the bottom of the tank. In the preferred embodiment, the first outlet is located at or near the bottom, either in alignment, or above the drain outlet.

The second outlet, for gas, is located in the upper half of the tank. In the preferred embodiment, the second outlet is located substantially at or near the top of the tank. More preferably still, the second outlet is on the top of the tank, thereby better facilitating the flow of gas to be vented to atmosphere, or through a demister.

In the preferred embodiment, a demister is provided on the second outlet to reduce or abate the release of any droplets of liquid in mixture with the gas being vented. Additionally, the gas may be captured/stored. In some systems scrubbing or other treatment may be required.

In one example at least one baffle extends upward through the liquid, substantially vertically, although an angle of 45° is envisaged to be adequate, and even shallower slopes may also be sufficient, defining a first region on one side of the baffle and a second region on the other side the baffle. Turbulence in the first region may be brought about by the inflow of liquid from the antechamber, falling down onto the liquid within the tank. There is preferably both a liquid transfer gap and a gas transfer gap, so gas and liquid can flow through respective transfer gaps from the first region to the second region, the gas transfer gap being above the normal liquid level, for example being adjacent to the top of the tank.

In another example at least one baffle is arranged as a shelf, which may be sloping and may be perforated, and the liquid introduced from the antechamber flows over or through the baffle, or over or through a succession of baffles at different heights, to reach the second region, which is below the lowest baffle. Whilst the one or more baffles may be straight, it is envisaged that the baffles may be angled, or curved to better guide the gas purged from the liquid gas mixture.

One such embodiment is the angling of the baffle such that the upper end of the baffle extends towards the first region, with the lower end of the baffle extending more into the second region. Alternatively, the angle, or curve can be reversed such that the upper end leans towards the second region, with the lower end extending into the first region.

Whilst the baffle may be free standing, in the preferred embodiment, at least one baffle abuts the antechamber. Preferably, this is the boundary defining baffle. In alternative embodiments, the first region may be defined by a plurality of baffles, with spacings therebetween.

Whilst it is envisaged that any material of construction may be used, preferably the material of construction is such that it does not react with the liquid-gas mixture being circulated within the tank, such as but not limited to stainless steel, epoxy coated plastics etc. It is possible to manufacture the tank by 3D printing, or more conventional means.

Normally, the turbulence from the antechamber and the first region is sufficient to degas the liquid-gas mixture. In another embodiment it is envisaged that there may be a cascade tray, perforate tray or similar device to further agitate the mixture. The cascade tray may have a plurality of small openings, allowing for the solution to collect prior to cascading to settle in the main body of solution, or larger holes to reduce accumulation of fluid in the tray.

Means for causing flow of the aqueous solution are not described further herein as they are considered part of the associated system, and include means known to an individual of ordinary skill in the art.

According to the invention there is also provided a method for degassing a liquid-gas mixture, said method comprising the following steps:
  providing an enclosed tank for use in a system requiring the degassing of a liquid gas mixture, the tank being adapted to contain a liquid, the liquid having a normal operating level at an intermediate height within the tank, wherein:
    one or more baffle(s) in the tank define a first region and a second region, wherein the first region accommodates relatively turbulent conditions for the liquid, and the second region accommodates relatively calm conditions for the liquid, and
    a liquid transfer gap is present so liquid can transfer from the first region to the second region, and
    a gas transfer gap is present to allow gas to transfer from the first region to the second region;
  causing the liquid-gas mixture to flow within the system to the tank through an inlet,
    the inlet being to an antechamber of the tank, and the antechamber having an outlet which is above the normal operating level of the liquid, flowing the liquid-gas mixture through the antechamber outlet, the liquid-gas mixture then entering the first region, wherein:
the liquid-gas mixture cascades into the first region, turbulence in the first region encourages the removal of gas dissolved in the liquid-gas mixture,
allowing the substantially degassed liquid to flow from the first region to the second region via the liquid transfer gap, and
causing the substantially degassed fluid to flow from the second region through a first outlet for use elsewhere in the system, and
removing gas from the tank via a second outlet.

The method of degassing a liquid-gas mixture may use any and all of the physical limitations of the tank described above.

The aqueous solution enters the tank via an antechamber which is optionally adapted to increase turbulence in the solution, aiding with the dissolved gases to be purged. The turbulent solution leaves the antechamber to enter the first region defined by one or more baffle(s). The one or more baffle(s) allow the flow of the substantially degassed liquid from the first region through a liquid transfer gap to a second region. In some embodiments, the liquid and gas transfer gap may be one and the same, as depicted in some of the figures.

There are provided at least two outlets, for the transfer of substantially degassed liquid to the system, and for the gas removed from the solution to be vented to atmosphere or otherwise captured or used. Some systems may find use for this gas. Therefore, further processing or storage may be desirable. Processing may include, but is not limited to compression or drying.

A further outlet may be provided to allow for the draining of the tank, should the volume exceed a pre-determined threshold monitored and controlled by a liquid level sensor and control unit. A refilling inlet may also be provided to allow for the (re)filling of the tank, should liquid levels drop too low.

There may be used a plurality of sensors, such as a water level sensor, temperature sensor and/or pressure sensor, each with pre-determined thresholds used to maintain desired conditions withing the tank. A controller, or controllers, to which said sensors are attached may be used to ensure the desired conditions are maintained. Additionally, a heater/heating element may be employed. Alternatively, a heat exchanger may be used to cool the mixture to be degassed, or either the degassed liquid, or released gas.

In the method of operation, the gas exiting the gas outlet may optionally be fitted with a demister, in the preferred embodiment.

Figure 1B:
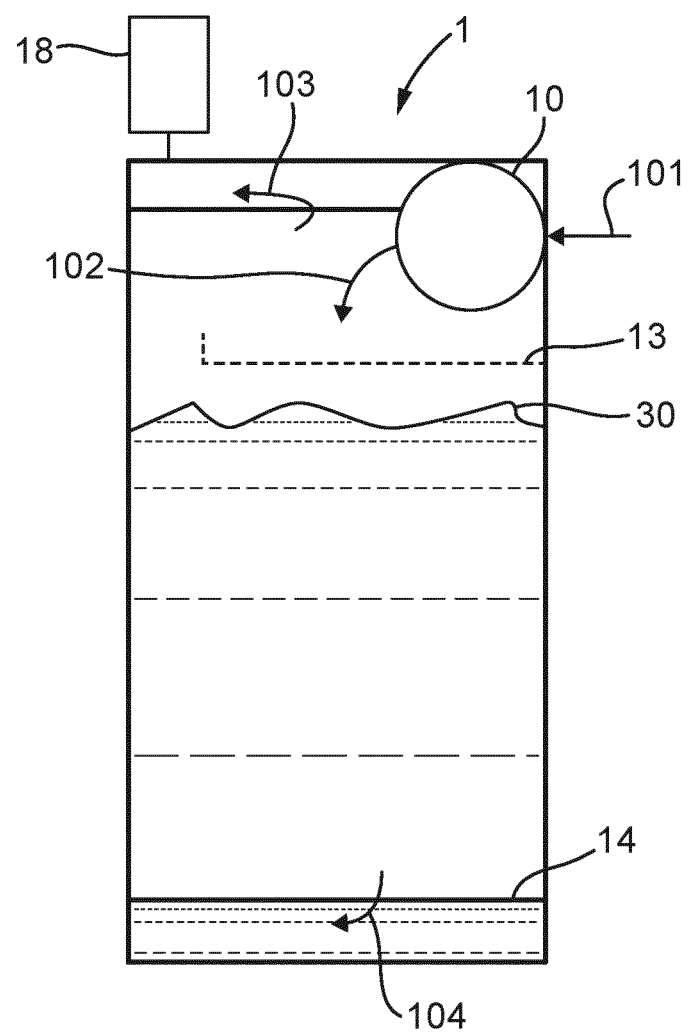
Figure 2A:
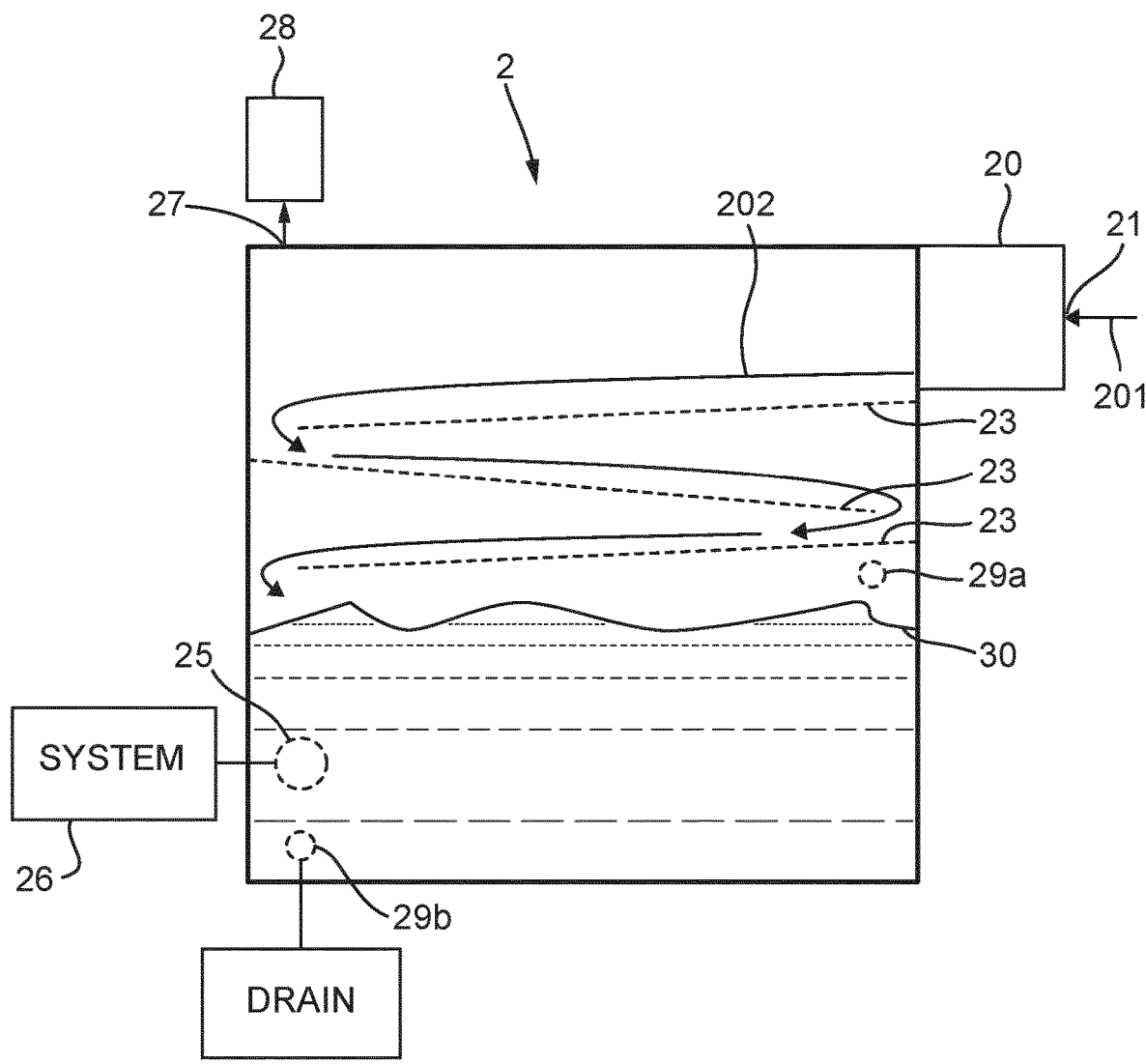
Figure 2B:
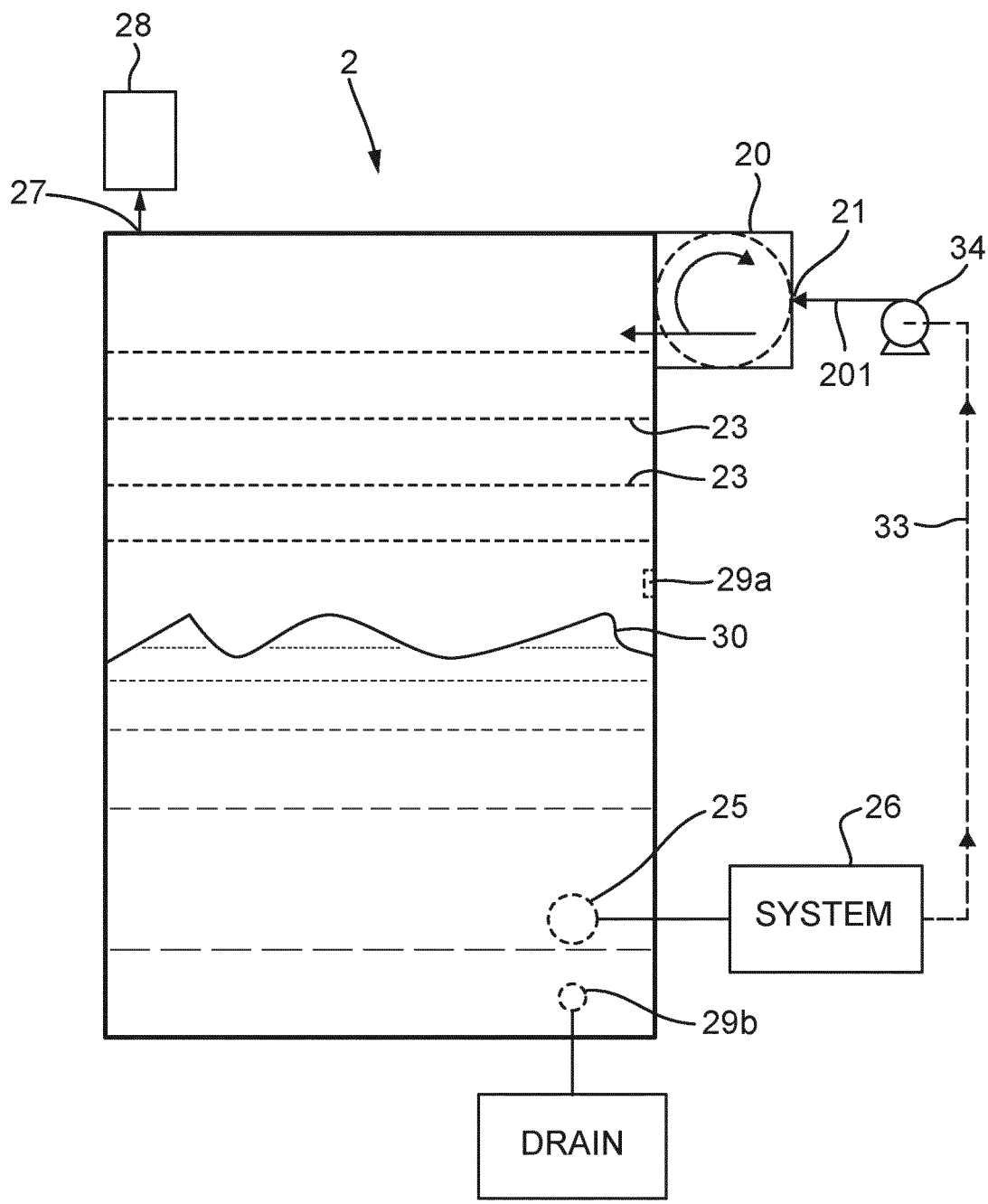

To help with the understanding of the invention, specific embodiments thereof will now be described by way of example and with reference to the accompanying drawings, in which:

FIG. 1A shows a schematic side view of a first embodiment of a tank in accordance with the present invention, FIG. 1B shows a cross sectional view of the tank of FIG. 1A on the line B-B, FIG. 2A shows a cross section of a second embodiment of a tank in accordance with the present invention FIG. 2B shows a cross section of a tank similar to that of FIG. 2A, but with modifications.

Referring to FIGS. 1A and 1B, there can be seen the tank 1 with an antechamber 10; the antechamber 10 has an inlet 11 and an outlet 12 which are not aligned. The tank 1 is divided into two regions by a substantially vertical baffle 14.

The inlet 11 feeds into the antechamber 10. The inflowing aqueous solution 101 enters the antechamber 10 whereupon turbulent conditions are present. The outflowing aqueous solution 102 exits the antechamber 10 via the outlet 12. From the outlet 12, the aqueous solution falls into the first, relatively turbulent, region to the right of the baffle 14 as shown, because the outlet 12 of the antechamber 10 is well above the normal level 30 of liquid within the tank 1.

A tray 13 is optional for further agitating the aqueous solution to be de-gassed. The tray may be perforated allowing the solution to flow through, or without any perforations but with a lip such that the tray fills and overflows to cascade below creating more turbulence; in such a case there would be a gap between the tray and a wall of the tank to allow for the fluid to cascade. Any variant thereof could be employed.

The baffle 14 defines a gas transfer gap and a liquid transfer gap, as denoted by the arrows 103 and 104 respectively. In the second, relatively calm, region (to the left of the baffle 14 as shown), there is a gas outlet 17 for the removal of the gas-vapour mixture, normally to a demister 18. Below the normal liquid level 30, there is an outlet 15, for circulating the substantially degassed liquid in the relevant system 16. Also shown is a refill inlet 19a and a drain 19b for maintaining the desired liquid level 30.

FIG. 1B shows the preferred cylindrical shape (curvature not to scale) of the antechamber 10, and how the liquid flows 101 in. The cross sectional view is of the relatively turbulent first region, with the relatively calm region being on the other side of the baffle 14 (shown by bolder lines). The arrows 103 and 104 show the liquid and gas travelling from the first region to the second region respectively. Also visible is the cascade tray 13 with a lip.

In the tank depicted in FIGS. 1A and 1B, the aqueous solution enters the antechamber, preferably with a high velocity. The antechamber is curved such that the solution is forced into turbulent conditions. The solution leaves via the outlet 12 to cascade, via the optional tray 13, to the first region. The turbulent conditions purge the gas, allowing for the gas-vapour mixture to flow 103 via the gas transfer gap to the second region, and out of the tank via the outlet 17 and demister 18. The substantially degassed aqueous solution can travel via the liquid transfer gap 104 to the second region, to flow out to an accompanying system 16 via the outlet 15. This arrangement allows for the aqueous solution flowing to the system 16 to be relatively free of gas bubbles.

Although sensors and the accompanying control units are not shown, their mode of operation will now be briefly described. Refilling would be triggered when the liquid level dropped below a lower tolerance. The tank would normally then refill until a second pre-determined threshold liquid level was reached. Conversely, the tank could be drained via the drain, should the liquid level become too high, until the level was back within a desired range.

The temperature can be controlled by a heating element and corresponding thermocouple. Cooling may be done by draining and refilling the system but is preferably performed by a heat exchanger. Heat exchangers, or heat integration systems may be used to improve efficiency.

Now referring to FIG. 2A, a cross sectional side view of a tank 2 can be seen. In this embodiment, the antechamber 20 is external to the main body of the tank. The aqueous solution flows (as 201) into the antechamber 20 via an inlet 21, and then flows (as 202) into the body of the tank 2. Baffles, which may be in the form of inclined trays 23, with or without perforations, can be seen directing the solution to the second region (which in this case is the lower part of the tank 2), the movement aiding in the degassing of the solution.

The substantially degassed solution settles and leaves the tank via the outlet 25 to a system 26. The gas-vapour mixture leaves the tank via the outlet 27 and to a demister 28, alternatively, it could be a vent to atmosphere.

Referring to 2B, a similar tank to the one seen in FIG. 2A can be seen, from a different perspective. The aqueous solution flows in via the antechamber 20 to the first, baffled, region directing the flow downwards to the second settling region. From this second region the aqueous solution leaves via an outlet 25 to flow to the system 26. The gas-vapour mixture would flow to the top counter-currently to the fluid flow downwards, or alternatively by a direct channel (not shown), to leave by a second outlet 27 to atmosphere or a demister 28.

For the second embodiment, much like the first, the aqueous solution enters into the tank at a high velocity, via an antechamber 20, to create turbulent conditions in the antechamber 20. The solution exits the antechamber with a relatively decreased velocity, to enter the first region. The baffles 23 of this region help decrease the turbulence, and allow for gas to leave the mixture. As a result, the liquid solution collected at the bottom for circulation to the system is relatively free of gas bubbles, and the gas vapour mixture is relatively dry. A demister 28 may be provided for further separation. A drain 29b and refill inlet 29a are also shown.

As indicated by the broken line 33 in FIG. 2B the aqueous solution may be recirculated through the system 26 and the tank 2 repeatedly, for example by a pump 34, in a context in which the system 26 introduces a gas into the aqueous solution, and this gas is then removed by passage through the tank 2. The invention is not intended to be limited by the order of the system and pump, or other components constituting the balance of plant. For example the aqueous solution might be a dilute solution of potassium hydroxide (KOH), but any suitable alkaline electrolyte may be used, and the system 26 an electrolysis unit to electrolyse the aqueous solution to generate hydrogen and oxygen gases. The aqueous solution would be recirculated through the tank 2 to remove any remaining gas before the aqueous solution is returned to the electrolysis unit of the system 26. Recirculation of the aqueous solution is equally feasible with the tank 2 of FIG. 2A or the tank 1 of FIGS. 1A and 1B.

Not shown in the figures are the optional sensors for monitoring temperature and fill level. Nor is there shown a control unit and associated modules shown. The present invention is not intended to be limited to such features. However, such sensors in combination with a control unit and other components allow for monitoring and maintaining conditions within an acceptable range, pre-determined by the user or designer of such a system.

For any and all embodiments, a plurality of sensors may be employed such as liquid level sensors, temperature sensors, and more. Such sensors would be employed in an expected fashion, and the control systems applied not meriting description herein.

The removal of dissolved gases is beneficial in the operation of many systems. It can reduce damage to the equipment, help keep the system volume consistent, improve efficiency and more.

The invention is not intended to be restricted to the details of the above described embodiments. For instance, the arrangements could be combined such as replacing an internal antechamber with an external antechamber, venting to atmosphere as opposed to a demister or equivalent.

The present invention is not intended to be limited to a material of construction, as a multitude of materials may be suitable, depending upon the physical characteristics of the solution to be circulated. Any number of coatings or varnishes, such as epoxy, may be employed to further increase the longevity of the tank.

The present invention is not intended to be limited to the designs disclosed in the figures, whilst the baffles are depicted as straight, they could be angled, for example Additionally, many tank shapes may be used in accordance with the present invention, such as cuboid, or cylindrical or something more irregular. A tank in accordance with the present invention may use features from either and any conceivable embodiment.

The total size of the tank is also not intended as a limitation, neither is the system the liquid degassing means is to be used in. It is envisaged liquid degassing means, and the method of operation thereof will be used in an electrolytic system, but alternative systems may also employ the device and method of use.

The aqueous solution is require to flow in order for the liquid degassing means to work. The flow of aqueous solution through the system, and through the tank, may involve recirculation. This could be done by any number of pumps or equivalent components, and the invention is not to be limited by such features.

In the preferred embodiment, the system involves flow of a weak alkaline solution, namely dilute KOH. That said, it is envisaged that a system could require a different solution be it neutral, strongly alkaline, weakly acidic or strongly acidic. The present means and method can be employed to degas any fluid mixture without departing from the spirit of the invention.

The invention claimed is:

1. An electrolytic system comprising means for degassing a liquid-gas mixture, said means comprising:
    an enclosed tank to contain a liquid, the liquid having a normal operating level at an intermediate height within the tank, the tank having:
        one or more baffle(s) within the body of the tank, wherein:
            at least one of the baffle(s) substantially defines a boundary of a first region and a second region, wherein:
                the first region accommodates relatively turbulent conditions for the liquid, and
                the second region accommodates relatively calm conditions for the liquid,
                wherein there is provided:
                    a liquid transfer gap for the transfer of liquid from the first region to the second region, and
                    a gas transfer gap for the transfer of gas from the first region to the second region,
        an inlet, the inlet being for the introduction of a liquid-gas mixture from an electrolyzer, and
        an antechamber, wherein:
            the inlet enters the antechamber, and
            the antechamber has an outlet directed towards the first region, the antechamber outlet being above the normal operating level of the liquid, and
        a first outlet, wherein:
            the first outlet is adapted for the outflow of the substantially degassed liquid, and
            the first outlet is situated in the lower half of the tank, substantially below the normal operating level of the liquid and a second outlet, wherein:
the second outlet is adapted for the outflow of the gas purged from the liquid-gas mixture, and
the second outlet is situated in the upper half of the tank, substantially above the normal operating level of the liquid and
a refill inlet for maintaining the liquid at a desired liquid level, and
wherein a heating element or heat exchanger is provided in combination with a temperature sensor and a control unit for maintaining the temperature of the electrolytic system.

2. The electrolytic system of claim 1 wherein a drain outlet is provided.

3. The electrolytic system of claim 1 wherein, one or more additional sensors is coupled with one or more additional control units to maintain conditions within a range of pre-determined thresholds.

4. The electrolytic system of claim 3 wherein the one or more sensors is any one of, or a combination of:
water level sensor,
and
pressure sensor.

5. The electrolytic system of claim 1, wherein a demister is provided at the second outlet.

6. The electrolytic system of claim 1, wherein the antechamber is adapted to create turbulent conditions.

7. The electrolytic system of claim 1, wherein the antechamber is substantially cylindrical, and the inlet and the outlet of the antechamber are not aligned.

8. The electrolytic system of claim 1, wherein the one or more baffles are straight, or curved.

9. The electrolytic system of claim 1, wherein a cascade tray is provided between the antechamber outlet and the normal liquid level.

10. A method for degassing a liquid-gas mixture in an electrolytic system, said method comprising the following steps:
providing an enclosed tank for use in an electrolytic system requiring the degassing of a liquid-gas mixture, the tank being adapted to contain a liquid, the liquid having a normal operating level at an intermediate height within the tank, wherein:
one or more baffle(s) in the tank define a first region and a second region, wherein the first region accommodates relatively turbulent conditions for the liquid, and the second region accommodates relatively calm conditions for the liquid, and
a liquid transfer gap is present so liquid can transfer from the first region to the second region, and
a gas transfer gap is present to allow gas to transfer from the first region to the second region;
causing the liquid-gas mixture to flow from an electrolyzer to the tank through an inlet, the inlet being to an antechamber of the tank, and the antechamber having an outlet which is above the normal operating level of the liquid,
flowing the liquid-gas mixture through the antechamber outlet, the liquid-gas mixture then entering the first region, wherein:
the liquid-gas mixture cascades into the first region,
turbulence in the first region encourages the removal of gas dissolved in the liquid-gas mixture,
allowing the substantially degassed liquid to flow from the first region to the second region via the liquid transfer gap, and
causing the substantially degassed fluid to flow from the second region through a first outlet for use elsewhere in the electrolytic system, and
removing gas from the tank via a second outlet, and
providing a refill inlet for maintaining the liquid at a desired liquid level, and
wherein a heating element or heat exchanger is provided in combination with a temperature sensor and a control unit for maintaining the temperature of the electrolytic system.

11. A method for degassing a liquid-gas mixture as claimed in claim 10 wherein one or more additional sensors is used, the sensors being:
water level sensors,
and
pressure sensors.

12. A method for degassing a liquid-gas mixture as claimed in claim 10, wherein a drain is provided allowing for maintaining the liquid at a desired liquid level, the drain and the refill inlet being controlled by a control unit, the control unit being adapted to maintain levels within a pre-determined range.

13. A method for degassing a liquid-gas mixture as claimed in claim 10 wherein the gas leaving the second outlet is passed through a demister.

* * * * *